United States Patent [19]

Roesler, deceased

[11] 4,278,546
[45] Jul. 14, 1981

[54] TREATMENT OF A LIQUID BY CIRCULATION AND GAS CONTACTING

[75] Inventor: Frank C. Roesler, deceased, late of Stockton-on-Tees, England, by Johanna Roesler, executrix

[73] Assignee: Imperial Chemical Industries Limited, London, England

[21] Appl. No.: 870,040

[22] Filed: Jan. 16, 1978

Related U.S. Application Data

[63] Continuation of Ser. No. 733,410, Oct. 18, 1976, abandoned.

[30] Foreign Application Priority Data

Oct. 22, 1975 [GB] United Kingdom .............. 43362/75
Apr. 7, 1976 [GB] United Kingdom .............. 14098/76

[51] Int. Cl.$^3$ ............................................. C02F 3/22
[52] U.S. Cl. ................................... 210/626; 210/629; 210/750; 210/752; 210/195.3; 210/199; 210/220; 261/36 R; 261/77
[58] Field of Search ........................ 210/4-8, 210/14, 15, 60, 63 R, 194, 195 R, 220, 221 R; 261/29, 36 R, 77, DIG. 75

[56] References Cited

U.S. PATENT DOCUMENTS

| 118,472 | 8/1871 | Munzinger | 210/220 X |
| 370,016 | 9/1887 | Hyatt | 210/60 |
| 3,148,143 | 9/1964 | Donath | 210/60 |
| 3,439,807 | 4/1969 | Danjes | 261/DIG. 75 |
| 3,790,141 | 2/1974 | Champeau | 261/77 |
| 3,794,303 | 2/1974 | Hirshon | 261/DIG. 75 |
| 3,840,216 | 10/1974 | Smith et al. | 261/DIG. 75 |
| 3,900,420 | 8/1975 | Sebba | 261/DIG. 75 |
| 3,945,916 | 3/1976 | Boulenger | 210/7 |

FOREIGN PATENT DOCUMENTS

| 637728 | 11/1936 | Fed. Rep. of Germany | 210/220 |
| 2420076 | 11/1975 | Fed. Rep. of Germany | 210/220 |
| 2217047 | 9/1974 | France | 261/77 |
| 287605 | 1/1971 | U.S.S.R. | 210/220 |

Primary Examiner—Robert H. Spitzer
Attorney, Agent, or Firm—Cushman, Darby & Cushman

[57] ABSTRACT

Process and apparatus for treating waste water by circulating it, together with oxygen-containing gas, through communicating downflow and upflow pipes enclosed in a treatment chamber, the pipes being open at their bottom ends, and controlling the flow of waste water/gas mixture from the downflow pipe to cause gas bubbles to escape downwardly, or part downwardly and part upwardly, in the treatment chamber.

10 Claims, 9 Drawing Figures

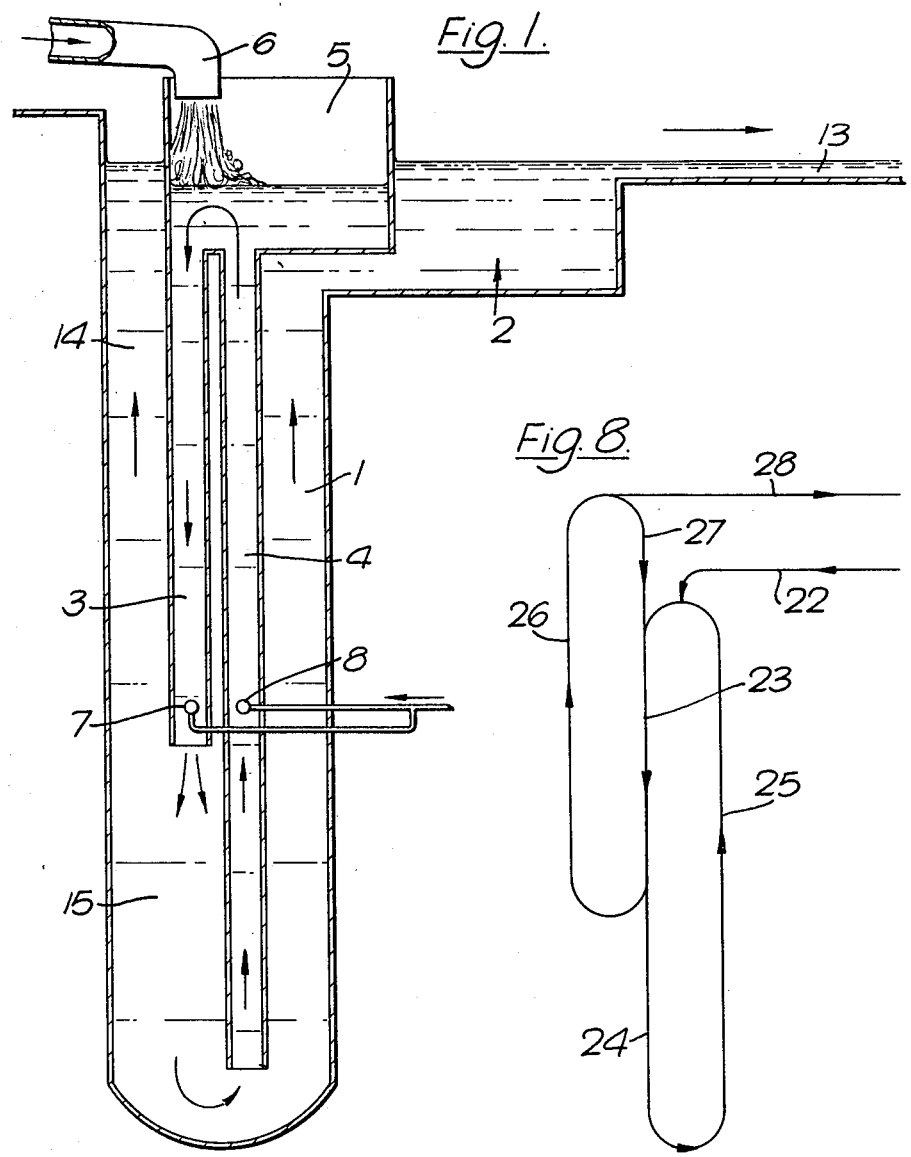

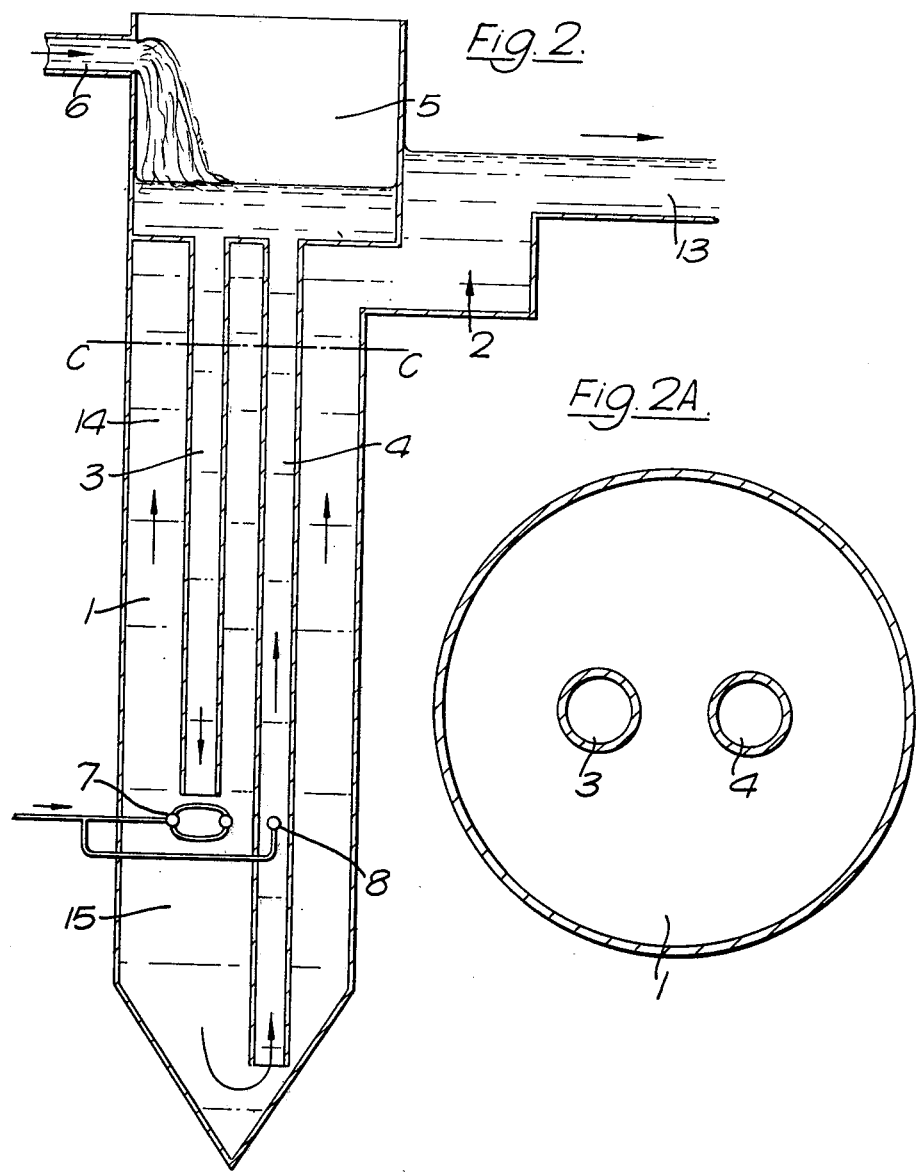

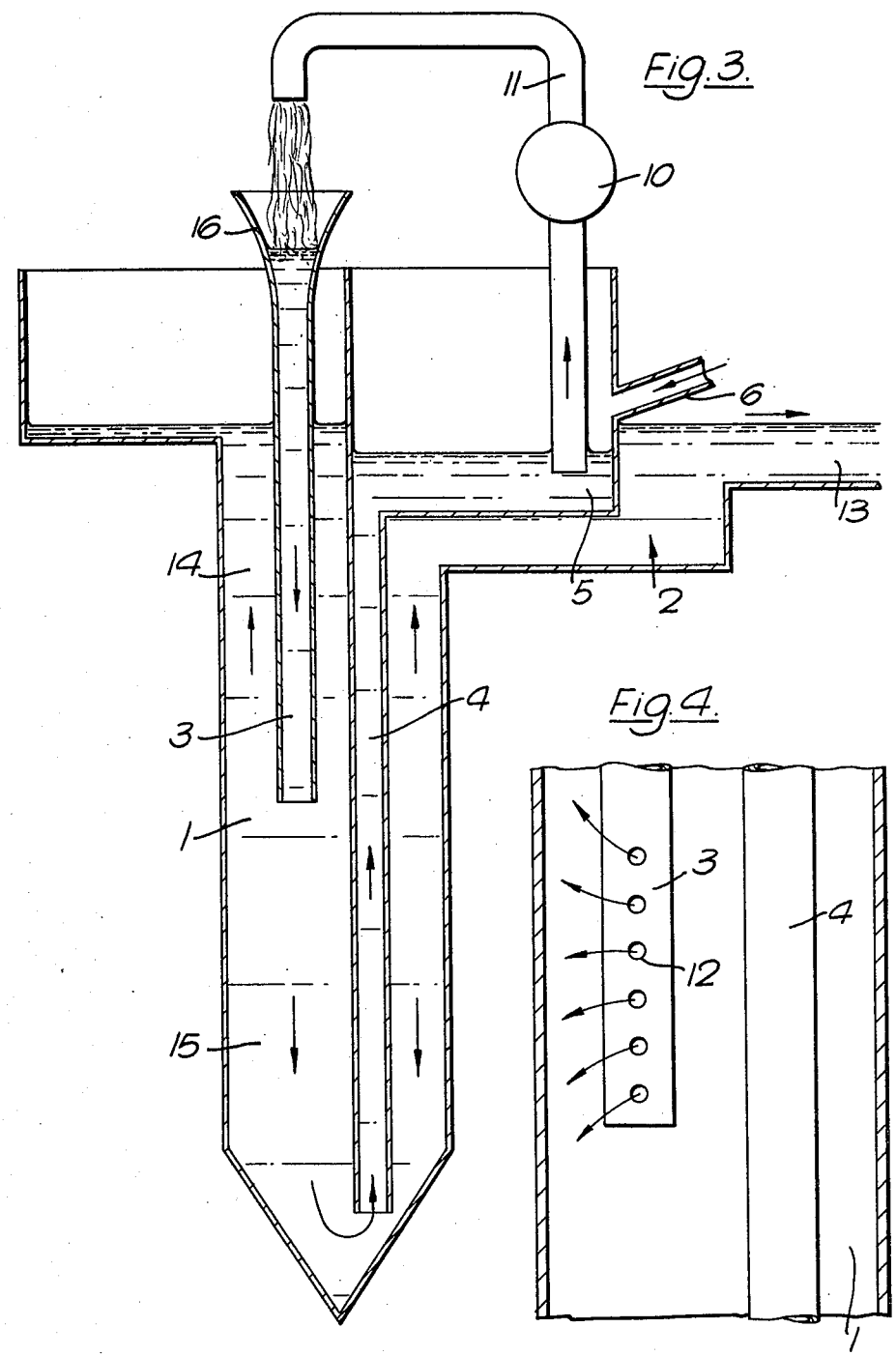

TREATMENT OF A LIQUID BY CIRCULATION AND GAS CONTACTING

This is a continuation, of application Ser. No. 733,410 filed Oct. 18, 1976, now abandoned.

This invention relates to a process and apparatus for the treatment of a liquid by circulating the liquid and bringing the circulating liquid into contact with a gas. In particular the invention relates to a process and apparatus for the treatment of liquid carrying biologically-degradable material in solution and/or suspension such as wastewater, ie. water carrying biologically-degradable waste material including all types of biologically-degradable domestic and industrial waste material for example normal domestic waste and the effluents produced by farms, food factories and other industries producing such waste.

The processes generally employed in the treatment of wastewater comprise essentially an initial treatment by physical methods such as screening and degritting to remove coarse and heavy material followed by a further treatment using biological methods to remove dissolved or small suspended waste materials. The biological treatment such as in the activated sludge system, involves a step in which the wastewater is oxygenated. It is important that in this step intensive oxygenation of the wastewater should be achieved. In so far as the present invention relates to the treatment of wastewater it relates to the oxygenation of the wastewater during the further treatment using biological methods.

In our co-pending cognated UK Applications Nos. 23328/73 and 53921/73 (corresponding to U.S. Ser. No. 467 511, now abandoned and Belgian Pat. No. 815 150) we describe a method and apparatus for the biological treatment of wastewater which comprises a step wherein wastewater is circulated around a system comprising a chamber of descending flow and a chamber of ascending flow communicating with each other at their upper and lower ends, an oxygen-containing gas being supplied to the wastewater as it passes through the chamber of descending flow.

According to the present invention we provide a process for the treatment of a liquid by circulating the liquid and bringing it into contact with a gas, wherein the liquid is continuously introduced into, circulated within and, after treatment, removed from an apparatus comprising a main treatment chamber having within it, or in communication with its interior at their lower ends, a downflow pipe and an upflow pipe, said downflow and upflow pipes communicating with each other at their upper ends through a part of the apparatus from which gas can escape and the lower end of the upflow pipe communicating with the chamber at a lower level than does the lower end of the downflow pipe, the liquid flowing downwardly in the downflow pipe and upwardly in the upflow pipe to produce in the chamber an upper region and a lower region in which regions the type of flow of liquid/gas mixture is essentially different, the upper region being above the level at which the lower end of the downflow pipe communicates with the chamber and the lower region being below this level, liquid flowing either upwardly or downwardly in the upper region of the chamber depending upon the manner in which the liquid is introduced into the apparatus, the liquid making contact with the said gas which is entrained by or injected into the liquid.

Also according to the invention we provide an apparatus, for the treatment of a liquid by circulating the liquid and bringing it into contact with a gas, which comprises a main treatment chamber having within it or in communication with its interior at their lower ends, a downflow pipe and an upflow pipe, said downflow and upflow pipes communicating with each other at their upper ends through a part of the apparatus from which gas can escape, and the lower end of the upflow pipe communicating with the chamber at a lower level than does the lower end of the downflow pipe, means whereby the liquid enters the apparatus, means whereby the liquid leaves the apparatus, means for circulating the liquid in the apparatus and means for introducing a gas into the liquid which is circulated in the apparatus. The means for introducing a gas into a liquid which is circulated in the apparatus includes any means for causing contact between a liquid and a gas to take place, for instance by gas being injected into or entrained by the liquid.

The invention is particularly useful in the further treatment of wastewater using biological methods and will throughout the remainder of this specification be described in terms of wastewater treatment. In this context the gas is an oxygen-containing gas by which we mean oxygen or any gaseous mixture such as air containing oxygen.

For convenience throughout the remainder of this specification the downflow pipe and the upflow pipe will be referred to as the pusher and sucker respectively. These pipes are not necessarily of circular cross-section.

Suitably the main treatment chamber is formed by a shaft sunk into the ground to a depth of up to 80 meters, preferably 25 to 50 meters. The chamber is suitably of circular cross-section. The pusher and sucker are preferably suspended within the chamber, their individual diameters being not greater than half the diameter of the main treatment chamber.

The sucker preferably extends near to the bottom of the main treatment chamber leaving a gap only large enough for unobstructed inflow to be readily possible. The pusher ends at a higher level, e.g between $\frac{1}{3}$ and $\frac{3}{4}$ of the depth of the chamber measured from the top. Effectively this causes the chamber to be divided into two regions, an upper region extending downwards to the lower end of the pusher and a lower region extending from the lower end of the pusher to the bottom of the chamber. In the upper region the liquid/gas mixture flows upwardly or downwardly essentially in slow plug flow in most basic embodiments, e.g those shown in FIGS. 1 to 3 and 5, but in embodiments wherein there is a supplementary downward flow in the pusher supplied by the drive jet pipe described hereinafter, a supplementary upward flow is superimposed upon the plug flow in the upper region. In the lower region there is a well mixed circulation of the liquid/gas mixture, with the net flow being downwardly from the pusher to the sucker.

Depending upon the treatment duty for which the apparatus is designed the relative lengths of the regions formed in the main treatment chamber can be suitably chosen. By adjusting the liquid velocity in the lower region the intensity of oxygenation can be varied by allowing varying proportions of the gas in the chamber to escape upwards. There are three main possibilities:

(a) By choosing a circulation rate such that the downward velocity of the liquid in the lower region is less than 0.15 m/s practically all gas bubbles will escape upwards and will be available for oxygenating the wastewater in the upper region. The oxygen already dissolved in the liquid as it contacts the air within or immediately below the pusher will however be carried down into the lower region.

(b) By choosing a circulation rate such that the downward velocity of the liquid in the lower region is 0.4 m/s or greater practically all gas bubbles will be carried down with the liquid and will be available for oxygenating the wastewater in the lower region, together with the oxygen already dissolved in the liquid within or immediately below the pusher.

(c) By choosing a circulation rate such that the downward velocity of the liquid in the lower region is intermediate between the velocities of (a) and (b) above an automatic division of gas bubbles will be achieved, some bubbles escaping to the upper region and some being carried down into the lower region.

The circulation rate of the liquid/gas mixture around the system can thus be used to control the intensity of oxygenation of wastewater in the two regions of the main treatment chamber. Further control may be achieved by having more than one opening through which liquid issues from the pusher into the chamber. If there are a plurality of openings in the pusher and these are spaced apart vertically a gradual build-up of liquid velocity in the main chamber will result and the bubbles and liquid issuing from the pusher will be distributed smoothly, part escaping upwards from the higher openings and part being carried downards from the lower openings.

Liquid entering the apparatus of the invention for treatment may enter through a pipe communicating with the pusher, e.g. communicating with a compartment such as a basin to which the pusher is connected or with which it communicates. Alternatively the incoming liquid may flow directly into the upper end of the main treatment chamber. In the first instance the liquid passes down the pusher into the lower region of the main treatment chamber whilst in the latter instance it passes down the main treatment chamber.

The main treatment chamber may if desired communicate at or near its lower end with a flotation chamber. In this instance liquid flows up the flotation chamber and during this upward flow gas dissolved in the liquid comes out of solution and forms gas bubbles on solid particles present causing these to be carried to the upper surface of liquid at the top of the flotation chamber from whence the solid particles may be removed. It is undesirable that large gas bubbles should enter the lower end of the flotation chamber and disturb the flow of liquid therein. This is avoided by designing the system such that any opening or openings between the main treatment chamber and the flotation chamber is or are of such dimensions and position that no air bubbles will be carried from the main treatment chamber into the flotation chamber. This can be achieved by controlling the velocity of the circulating flow in the main chamber so that it is low enough not to carry down bubbles. Alternatively a suitable form of trap, e.g a louvre structure may be provided at the entry of the passage to the flotation chamber. The flotation chamber is suitably a chamber, located at the side of the main treatment chamber and separated from it by a partition, or a pipe suspended in the main treatment chamber.

Except for the main opening at the end of the pusher which preferably points downward, the opening or openings in the pusher from which bubbles and liquid issue into the main treatment chamber are preferably nozzles directing the bubbles/liquid flow horizontally.

Since the opening of the lower end of the sucker is preferably close to the bottom of the treatment chamber, the sucker serves the additional purpose of removing any solids or sludge which might settle at the bottom of the chamber.

The circulating means may be a mechanical pump or, preferably, the oxygen-containing gas supplied to the system. In the former case wastewater is raised by the pump from a compartment such as a basin at the top of the sucker and drawn up to a position above the open upper end of the pusher into which it may fall, entraining air during the fall. In the latter case air or another oxygen-containing gas is blown into the sucker whose upper part then functions as an air-lift pump. In this latter case oxygenation is accomplished by injecting an oxygen-containing gas into the pusher or into the main treatment chamber just below the lower end of the pusher, e.g by a ring sparger.

In gas driven embodiments there will be during operation no significant amount of gas bubbles in the pusher whilst the upper region of the main chamber will contain a bubbly fluid. This leads to a hydrostatic head difference between the liquid in that part of the apparatus through which the pusher and sucker communicate (the inner basin of the drawings) and the liquid in the main treatment chamber (the outer basin of the drawings).

The invention as basically described hereinbefore is particularly useful in relatively small scale wastewater treatment plants wherein too great an oxygenation intensity is not required, e.g in plants for the treatment of normal domestic wastewater. In such cases the treatment air rate will be relatively small and the hydrostatic head difference between the main treatment chamber and the inner basin would be about 0.5 m or less.

However, the system of the invention may also be used for the treatment of wastewater with a high BOD such as certain industrial waste effluents. In this case the treatment gas rate will be much higher and there will be many more gas bubbles in the upper region of the treatment chamber. The hydrostatic head difference between the main treatment chamber and the inner basin can then attain values as high as 2 m. In effect under such conditions the upper region of the treatment chamber is capable of acting as a powerful air-lift pump.

In a very useful modification of the invention for higher transfer rates a supplementary flow of liquid is introduced into the upper part of the pusher from the upper region of the main treatment chamber, thus making use of the air-lift pump action. This can be done through a pipe (hereinafter referred to as the drive jet pipe) passing from the upper region of the main treatment chamber into the pusher and extending downwardly into the pusher for several pipe diameters. The jet flow of liquid passing through the drive jet pipes into the pusher serves to increase the momentum of the pusher flow and thus promotes vigorous circulation. Preferably a trap such as a lourve is located at the position where the drive jet pipe is joined to the main treatment chamber so as to prevent bubbles passing from the chamber into the pipe. Diagrams of suitable arrangements are shown in FIGS. 6 and 7 of the drawings and the circulation pattern around a system including this arrangement is shown in FIG. 8 of the drawings.

The modification including the supplementary flow of liquid is particularly useful in wastewater treatment systems in which a relatively high rate of oxygen transfer into the liquid is required (e.g $\geq 0.5$ kg $(O_2)/(h\ m^3)$). In such high-intensity systems the velocity of the supplementary flow in the upper chamber will suitably be between 0.4 m/s and 1.0 m/s. However even in low intensity treatment systems some gain is achieved by this modification by the super-imposition on the plug flow in the upper part of the main treatment chamber of a small extra circulation velocity. For low intensity operation this extra velocity can usefully be within the range of 0.05 to 0.15 m/s, especially 0.10 to 0.15 m/s. Operating the invention in this way will assist in keeping any sediment such as fine sand or mud in suspension, when otherwise it would settle into the lower region of the main treatment chamber. Whilst such sediment would ultimately be cleared by the sucker, a purge of solids from the compartment such as a basin into which the upper end of the sucker opens would be required periodically to prevent solids accumulating in the system. When a suitable velocity of flow (for instance above 0.1 m/s and particularly above 0.3 m/s) exists in the upper region of the main treatment chamber then any suspended sand-like sediment will be purged automatically via the main out-flow from the system.

In the gas-driven form of the apparatus of the invention for high-intensity treatment therewill be a sizeable difference in hydrostatic head, typically 1 m up to 2 m, between the liquid in the part of the apparatus through which the pusher and sucker communicate at their upper ends (described as the inner basin in the description with reference to the drawings) and the liquid in the main treatment chamber or in a compartment such as that referred to as the outer basin in the description with reference to the drawings at the upper end of the main treatment chamber. The modification described in the preceding paragraphs is based upon this head difference. When this head difference is used to drive a supplementary circulation through the pusher and the upper region of the main treatment chamber, a beneficial effect is achieved for oxygen transfer. In the case of high intensity treatment, when a large amount of air is rising up through the chamber, the supplementary circulation can be made quite strong and will then, through gas bubbles being carried down below the pusher, promote oxygen transfer in the lower region. The net flow issuing from the pusher will under these conditions be capable of stirring the flow in the lower region of the treatment chamber to considerable depth, thus promoting oxygen transfer and intensive mixing.

The design of the modification having a drive jet pipe is illustrated in the following example:

EXAMPLE

Consider an apparatus having a main treatment chamber with a total internal cross-sectional area of 1 $m^2$. Suitable dimensions of the pusher and sucker are 0.25 and 0.16 $m^2$ cross-sectional area respectively. Then the effective cross-sectional areas of the upper and lower regions of the main chamber are 0.59 $m^2$ and 0.84 $m^2$ respectively.

We assume that the velocity of flow in the lower region is 0.15 m/s. The corresponding flow rate is 0.126 $m^3/s$ and the velocity of flow in the sucker is 0.7875 m/s. Then:

Case 1

Assuming that the velocity of flow in the upper region is 0.5 m/s, the corresponding flow rate is 0.295 $m^3/s$. In this case the total flow rate through the pusher is 0.421 $m^3/s$ and the flow velocity in the pusher is 1.684 m/s.

In this case, if the flow velocity required in the drive jet pipe is 5 m/s, then the cross-sectional area of this pipe is 0.059 $m^2$. This can be easily fitted into the pusher.

Case 2

Alternatively assuming that the velocity of flow in the upper region is 0.7 m/s the corresponding flow rate is 0.413 $m^3/s$. In this case the total flow rate through the pusher is 0.557 $m^3/s$ and the flow velocity in the pusher is 2.228 m/s.

In this case, if the flow velocity required in the drive jet pipe is 6 m/s, then the cross-sectional area of this pipe is 0.0688 $m^2$. This can easily be fitted into the pusher.

The invention provides an advantage over commonly used activated sludge treatment systems in that no incoming raw effluent can by-pass a certain minimum duration of treatment. In commonly used systems, where there is an undivided chamber that is substantially one stirred vessel, there is always a possibility that some of the raw effluent to be treated will pass more or less immediately from the inflow to the outflow. In the system according to the present invention this can be made impossible by suitably locating the ducts through which raw effluent is supplied to, and treated effluent withdrawn from, the two regions of the treatment chamber. Thus in the embodiments shown in FIGS. 1, 2 and 3 all the effluent must necessarily pass through the upper region of slow plug flow 14 before leaving the system. In the embodiment shown in FIG. 5 all the effluent must pass through the upper region of slow plug flow 14 and moreover must pass at least once through the lower region 15 also before leaving the system. In the embodiment shown in FIG. 6 all the effluent must pass at least once through the pusher and through the upper region 14 of the treatment chamber. Furthermore, if in an embodiment as shown in FIG. 7, which is similar to that shown in FIG. 6 the raw effluent is supplied by a pipe reaching down to the lower end of the upper region 14, that is to a position just above the end of the pusher 3, and if the treated effluent is removed from the inner basin 5, then all incoming effluent must pass at least once through both regions of the treatment chamber before any of it can leave the system. This arrangement of inflow and outflow ducts would be preferred to the simpler arrangement shown in FIG. 6 if in any particular application the provision of an extended minimum duration of treatment was important. In all the described embodiments of the invention the quality of treatment will be more uniform than in commonly used systems with a single stirred-through treatment vessel, and therefore the certainty of destroying noxious substances and achieving a low final level of Biological Oxygen Demand will be greater.

The invention is illustrated by the accompanying drawings wherein:

FIG. 1 is a schematic diagram of a first embodiment.

FIG. 2 is a schematic diagram of a second embodiment.

FIG. 2A is a cross-section through the line c—c of FIG. 2.

FIG. 3 is a schematic diagram of a third embodiment.

FIG. 4 is a diagram of a part of the main treatment chamber of the first, second, third or fourth embodiments having an alternative form of pusher.

FIG. 8 is a diagram illustrating the circulation pattern in the apparatus of the invention.

Figure 5:
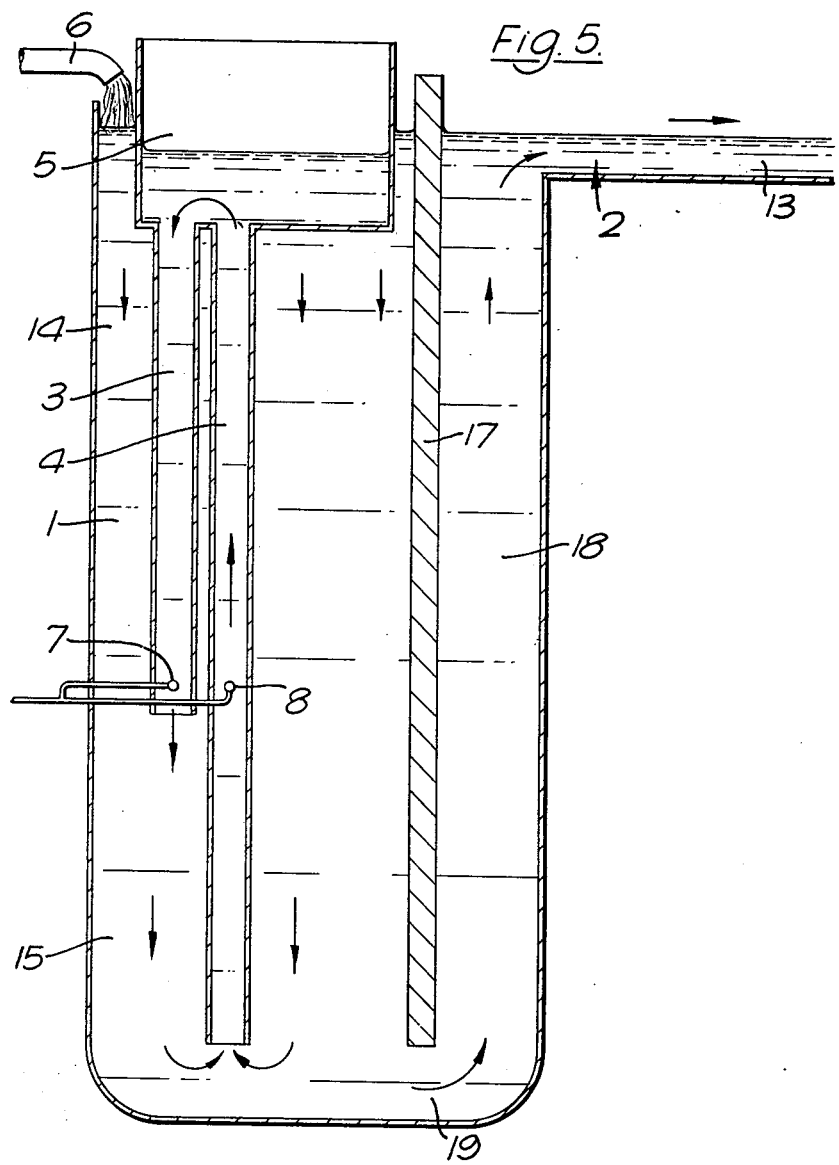
FIG. 5 is a schematic diagram of a fourth embodiment comprising a flotation chamber.

In the first, second, fourth and fifth embodiments circulation of liquid is induced by injecting a gas thereinto whilst in the third embodiment circulation is by mechanical means.

The first, second and fifth embodiments each comprise a main treatment chamber 1 closed at its lower end and widening at its upper end to form outer basin 2. Conveniently the main treatment chamber 1 is a shaft sunk into the ground with the other basin being located at or near ground level. However chamber 1 may of course also be a tower above ground. Within chamber 1 are pusher 3 and sucker 4 which are pipes opening into and extending downwardly from the bottom of inner basin 5 from which gas may escape, their lower ends being open. Sucker 4 extending downwardly for a greater distance than pusher 3. In these embodiments inner basin 5 is located mainly within outer basin 2. Liquid, e.g. wastewater enters inner basin 5 through a pipe 6 in all three embodiments. The difference in level between basins 2 and 5 is determined by the volume rate of air blown into sucker 4, the level in basin 5 being lower than that in basin 2.

In embodiments 1, 2 and 5 a gas e.g. air is injected into the system through spargers or sets of spargers 7 and 8, the compressed gas conveniently being supplied to both spargers or sets of spargers from a single compressor (not shown in the drawings). Spargers 7 and 8 in each embodiment are located at essentially the same level, sparger 8 being located in sucker 4 in both embodiments. In the first embodiment sparger 7 is located within pusher 3 whilst in the second and fifth embodiments it is located immediately below the open lower end of this pipe, blowing gas into the stream of liquid issuing from the pusher.

The third embodiment comprises a main treatment chamber 1 closed at its lower end and widening at its upper end to form outer basin 2. As in the other embodiments pusher 3 and sucker 4 extend downwardly into chamber 1 and have open lower ends. In the third embodiment as in the others, sucker 4 extends downwardly for a greater distance than pusher 3. In the third embodiment however it is only sucker 4 which opens into and extends downwardly from the inner basin 5. Pusher 3 is located at the side of basin 5 and its upper end extends above the level of the liquid in this basin. Liquid enters inner basin 5 from the sucker and through pipe 6, which is the entry for raw effluent, and is drawn upwardly from the basin by pump 10 into pipe 11 which first ascends and then descends. From the further end of pipe 11 the liquid falls through a distance into a suitably shaped duct 16 fitted to the top of pusher 3, carrying air down with it in the process.

FIG. 4 shows a part of a system wherein pusher 3 has a series of holes 12 at different levels in its wall towards its lower end thus allowing liquid and gas bubbles to escape from the pusher at different levels.

Basically the operation of any of the embodiments shown in FIGS. 1 to 3 or the alternative shown in FIG. 4 in the biological treatment of wastewater is similar. In each instance wastewater to be treated enters the inner basin through pipe 6 and leaves the outer basin through channel 13 after treatment. Circulation is either mechanically induced by pump 10 in FIG. 3 or by the injection of air through sparger 8 as in FIGS. 1 and 2. The air injected through sparger 7 may also contribute to maintaining circulation. With air induced circulation the upper part of sucker 4 is caused to act as an air-lift pump because of the voidage difference between the upper parts of pusher 3 and sucker 4. Aeration of the wastewater is caused by injection of air through spargers 7 and 8 in FIGS. 1, 2, 5, 6 and 7 and by the entrainment occurring in the fall of the wastewater from pipe 11 into the duct 16 on pusher 3 in FIG. 3.

Wastewater is caused to circulate from inner basin 5 down pusher 3 into the lower part of main treatment chamber 1 from whence it either flows slowly up the main treatment chamber into outer basin 2 or passes down to the bottom of the chamber and then into sucker 4, in which it rises quickly into inner basin 5 for recirculation. Effectively the main treatment chamber is divided into upper and lower regions 14 and 15 respectively, the upper region extending down to the lower end of pusher 3 and the lower region extending below this level. In upper region 14 there will be essentially plug flow except in the fifth embodiment whilst in lower region 15 there is a well mixed circulation of aerated wastewater. The effect of the alternative form of pusher 3 shown in FIG. 4 is to release liquid and air bubbles from the pusher at a variety of levels and thus provide for a smooth division of the liquid that subsequently flows upwardly into region 14 from that which further below will flow downwardly into region 15. This separation of the two liquid streams will cause a consequent division of the air flow into one part passing to the upper region 14 and another part passing to the lower region 15.

The arrangement of lateral openings shown in FIG. 4 could be replaced by other configurations for example pusher 3 could end in a series of coaxial pipes of successively reduced diameter, suspended one from the other.

The fourth embodiment shown in FIG. 5 is similar to the first, second and third embodiments as regards its essential features and operates in an essentially similar manner in the biological treatment of wastewater. Like the first and second embodiments the fourth embodiment is driven by the injection of air into sucker 4 though sparger 8 causing the upper part of sucker 4 to act as an air-lift pump. The fourth embodiment comprises a main treatment chamber 1 having suspended therein a pusher 3 and sucker 4 whose upper ends open into the bottom of inner basin 5. Air is sparged into pusher 3 and sucker 4 by spargers 7 and 8 respectively. As in the other embodiments sucker 4 extends downwardly into chamber 1 for a greater distance than does pusher 3. In operation treatment chamber 1 is effectively divided into two regions 14 and 15 as before, upper region 14 being a region of essentially plug flow unless a drive jet pipe is introduced into the apparatus and lower region 15 a region of well-mixed circulation. Treatment chamber 1 is divided by a partition 17 from a flotation chamber 18, there being an opening or openings 19 below or near the lower end of partition 17 whereby liquid can pass from chamber 1 to chamber 18. At its upper end chamber 18 opens into outer basin 2 from whence liquid leaves the apparatus at 13. In the fourth embodiment incoming wastewater enters the upper end of treatment chamber 1 through pipe 6 rather than, as in the other embodiments, entering inner basin 5.

In operation in the treatment of wastewater the fourth embodiment functions as described hereafter. Incoming wastewater enters the upper end of treatment chamber 1 through pipe 6 and passes downwardly in plug flow while being aerated through the upper region 14 of this chamber into lower region 15 wherein it continues to be aerated. The major part of the wastewater then passes up sucker 4 into inner basin 5 thence into pusher 3. Most wastewater passes around the sucker/pusher loop several times before passing through opening 19 into flotation chamber 18. Opening 19 is from a region of the main chamber 1 where the downward velocity of flow is insufficiently large to carry bubbles down, which prevents large air bubbles from passing through opening 19 and disturbing the steady flow in flotation chamber 18. In this chamber as the wastewater rises dissolved air comes out of solution and the bubbles produced thereby form on or attach themselves to solid particles present in the water bearing these to the surface of the liquid in basin 2 from whence said solids may be removed and, e.g. returned to upper basin 5 for further treatment. Treated wastewater leaves outer basin 2 at 13.

Figure 6:
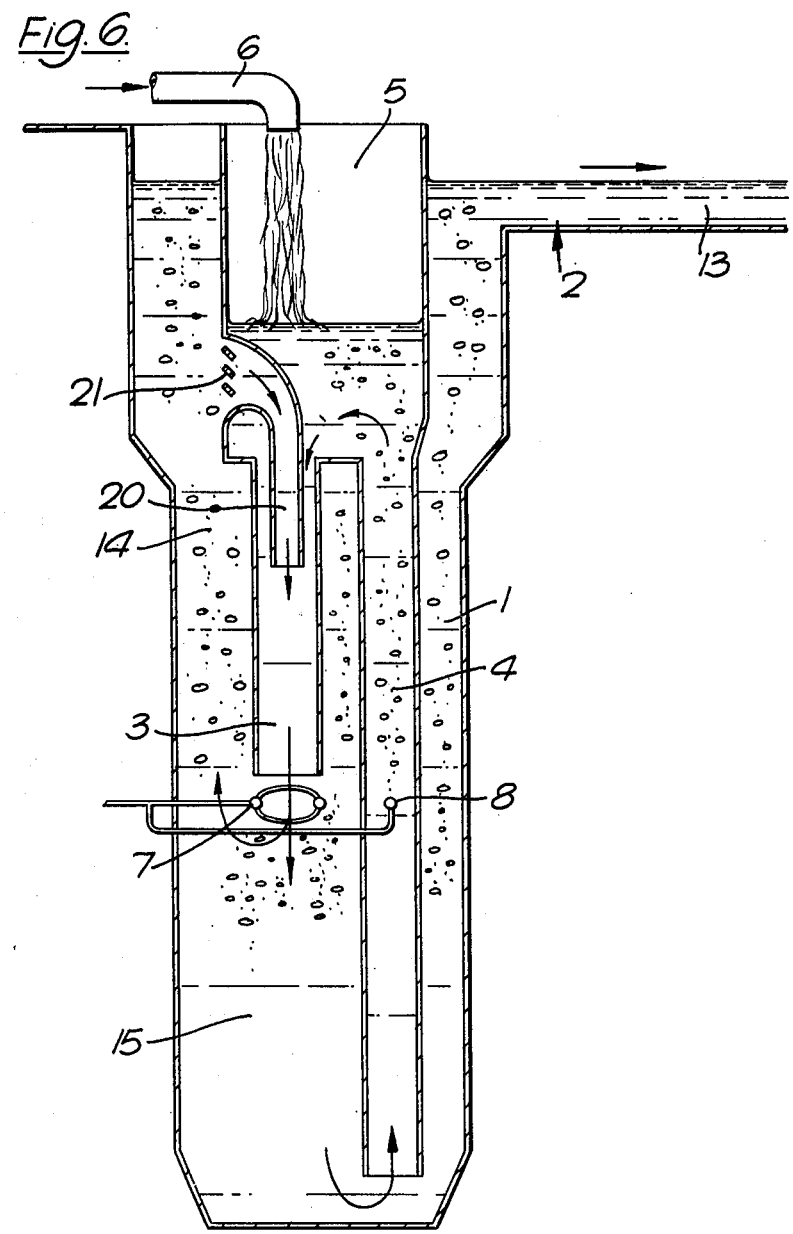
FIG. 6 is a schematic diagram of a fifth embodiment being the modification with the drive jet-pipe. This drawing is essentially the same as FIGS. 1 and 2 apart from the inclusion of the drive jet pipe and an associated trap.
Figure 7:
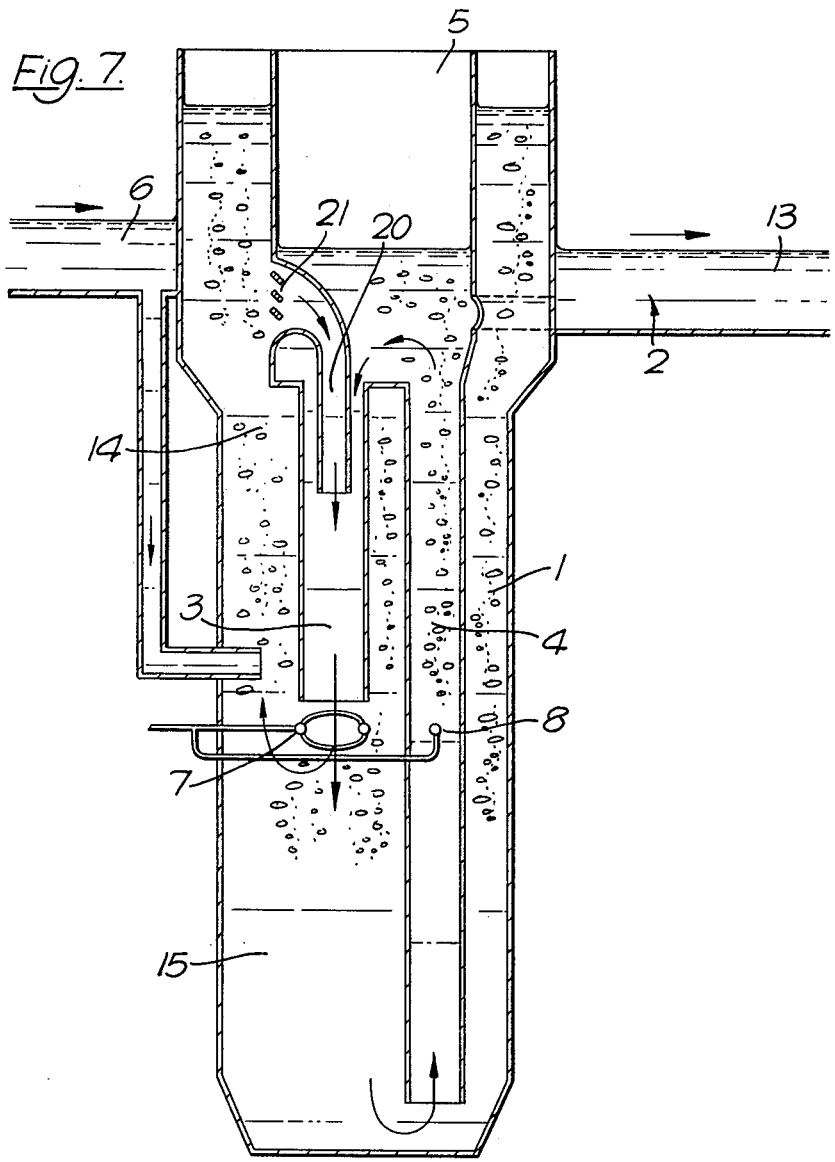
FIG. 7 is a modification of the embodiment shown in FIG. 6.

The fifth embodiment shown in FIG. 6 and the modification thereof shown in FIG. 7 are the same as the first and second embodiments as regards their basic details. They have however the important difference that drive jet pipe 20 leads from the upper region of main treatment chamber 1 through inner basin 5, without communicating therewith, and into pusher 3. Trap 21 at the point where pipe 20 opens out from main treatment chamber 1 prevents large bubbles from passing down pipe 20 into pusher 3.

In operation the drive jet pipe 20 causes a supplementary circulation which superimposes itself upon the basically essential plug flow circulation in upper region 14 of chamber 1 and intensifies oxygenation. A zone of high turbulence occurs immediately below sparger 7 which injects gas into the liquid issuing from the lower end of pusher 3.

In FIG. 8 there is shown a flow pattern around the apparatus of the invention. In this diagram flow follows in the direction marked by the arrows. Flows in the various parts are marked as follows:

Along inflow pipe—22
Down pusher—23
Down lower region of main treatment chamber—24
Up sucker—25
Up upper region of main treatment chamber—26
Down drive jet pipe—27
Along outflow pipe—28

In the first four embodiments the flow down 27 is zero.

Suitable liquid flow velocities in the various parts are as follows (values are given in m/s):

Down pusher (23)—1.0 to 2.5, preferably 1.5 to 2.
Down lower region of main treatment chamber (24)—the liquid flow velocity in this region may be varied depending upon the flow pattern of the gas bubbles which it is desired to achieve, as explained hereinabove. For example, the liquid flow velocity may conveniently be 0.05 to 0.25, preferably 0.10 to 0.20.

Up sucker (25)—0.40 to 1.20, preferably 0.60 to 1.00.
Down drive jet pipe—2 to 6.

With regard to the upper region of the main treatment chamber (26) there are two cases:

(1) System with no drive jet pipe fitted.

In this case the flow in the upper region can be upward (FIGS. 1, 2, 3) or downward (FIG. 4) but will always be very slow—usually less than 0.10.

(2) System with drive jet pipe fitted.

In this case the flow in the upperregion will be upward, and suitable velocities will be 0.10 to 0.80 m/s, preferably 0.30 to 0.60 m/s.

It is claimed:

1. A process for the treatment of wastewater containing biologically degradable material, utilizing a main treatment chamber, a downflow pipe, and an upflow pipe; said downflow and upflow pipes being disposed within the main treatment chamber and in communication with the interior of the main treatment chamber at the lower ends thereof, and being in communication with each other at the upper ends thereof in a basin from which gas may escape; the lower end of the upflow pipe communicating with the chamber at a lower level than does the lower end of the downflow pipe; an upper region of the chamber being above the level at which the lower end of the downflow pipe communicates with the chamber, and a lower region of the chamber being below this level; said process comprising the steps of continuously introducing wastewater into the chamber;

producing different types of flow in the upper and lower regions by continuously recirculating wastewater along a circulatory path within the chamber, including downwardly in the downflow pipe into and through the lower region and upwardly in the upflow pipe; continuously introducing gas into the wastewater so that the wastewater in the circulatory path makes contact with gas during circulation thereof, the wastewater continuous circulation and gas continuous introduction steps being accomplished by introducing gas-upwardly into the upflow pipe, all the wastewater in the upflow pipe flowing into the basin where gas is allowed to escape, and from the basin all the wastewater flowing into the downflow pipe, -and while it is flowing downwardly in the main treatment chamber; and by controlling the circulation rate of the wastewater and gas so that the downward velocity of wastewater in the lower region effects an automatic division of gas bubbles therein, some escaping upwardly to the upper region, and others being carried downwardly into the lower region; and continuously removing wastewater after sufficient treatment of the biologically degradable material therein.

2. A process as recited in claim 1 wherein the flow type in said upper region is essentially plug flow while the type of flow in said lower region is a well mixed circulation of aerated wastewater.

3. A process as in claim 1 wherein the wastewater in the upper region of the chamber flows upwardly.

4. A process as in claim 1 wherein the wastewater in the upper region of the chamber flows downwardly.

5. A process for the treatment of wastewater containing biologically degradable material, utilizing a main treatment chamber, a downflow pipe, and an upflow pipe; said downflow and upflow pipes being disposed within the main treatment chamber and in communication with the interior of the main treatment chamber at the lower ends thereof, and being in communication with each other at the upper ends thereof in a basin from which gas may escape the lower end of the upflow pipe communicating with the chamber at a lower level than does the lower end of the downflow pipe; an upper region of the chamber being above the level at which the lower end of the downflow pipe communicates with the chamber, and a lower region of the chamber being below this level; said process comprising the steps of continuously introducing wastewater into the chamber;

producing different types of flow in the upper and lower regions by continuously recirculating wastewater along a circulatory path within the chamber, including downwardly in the downflow pipe into and through the lower region and upwardly in the upflow pipe; continuously introducing gas into the wastewater so that the wastewater in the circulatory path makes contact with gas during circulation thereof, the wastewater continuous circulation and gas continuous introduction steps being accomplished by introducing gas-upwardly into the upflow pipe, all the wastewater in the upflow pipe flowing into the basin where gas is allowed to escape, and from the basin all the wastewater flowing into the downflow pipe, -and while it is flowing downwardly in the main treatment chamber; and by controlling the circulation rate of the wastewater and gas, so that the downward velocity of the wastewater in the lower region is sufficiently low to allow upward escape of substantially all gas bubbles therein; and continuously removing wastewater after sufficient treatment of the biologically degradable material therein.

6. A process for the treatment of wastewater containing biologically degradable material, utilizing a main treatment chamber, a downflow pipe, and an upflow pipe; said downflow and upflow pipes being disposed within the main treatment chamber and in communication with the interior of the main treatment chamber at the lower ends thereof, and being in communication with each other at the upper ends thereof in a basin from which gas may escape; the lower end of the upflow pipe communicating with the chamber at a lower level than does the lower end of the downflow pipe; an upper region of the chamber being above the level at which the lower end of the downflow pipe communicates with the chamber, and a lower region of the chamber being below this level; said process comprising the steps of continuously introducing wastewater into the chamber;

producing different types of flow in the upper and lower regions by continuously recirculating wastewater along a circulatory path within the chamber, including downwardly in the downflow pipe into and through the lower region and upwardly in the upflow pipe; continuously introducing gas into the wastewater so that the wastewater in the circulatory path makes contact with gas during circulation thereof, the wastewater continuous circulation and gas continuous introduction steps being accomplished by introducing gas-upwardly into the upflow pipe, all the wastewater in the upflow pipe flowing into the basin where gas is allowed to escape, and from the basin all the wastewater flowing into the downflow pipe, -and while it is flowing downwardly in the main treatment chamber; and by controlling the circulation rate of the wastewater and gas, so that the downward velocity of the wastewater in the lower region is sufficiently high to cause substantially all of the gas bubbles to be carried downwardly into the lower region; and continuously removing wastewater after sufficient treatment of the biologically degradable material therein.

7. Apparatus for the treatment of wastewater containing biologically degradable material, comprising a main treatment chamber, a generally vertically extending downflow pipe, a generally vertically extending upflow pipe, a basin from which gas may escape, said downflow and upflow pipes being disposed within the main treatment chamber and in communication with the interior of the main treatment chamber at the lower ends thereof, and in communication with each other at the upper ends thereof in the basin, the lower end of said upflow pipe communicating with the chamber at a lower level than the lower end of said upflow pipe, means for recirculating wastewater along a circulatory path within said chamber, including up the upflow pipe and down the downflow pipe, means for introducing gas into the wastewater by introducing gas upwardly in the upflow pipe, and so that wastewater in the circulatory path makes contact with gas during circulation thereof, all the wastewater in the upflow pipe flowing into the basin where gas is allowed to escape, and all the wastewater flowing into the downflow pipe, means for controlling the circulation rate of the wastewater and gas, and means for continuously removing wastewater from said chamber after sufficient treatment of the biologically degradable material therein.

8. Apparatus as claimed in claim 7, wherein the chamber comprises a shaft having a length of up to 80 meters.

9. Apparatus as claimed in claim 7, wherein the lower end of the upflow pipe is located near to the bottom of the chamber and the lower end of the downflow pipe is located above the lower end of the upflow pipe.

10. Apparatus as claimed in claim 7, further including means for imparting a supplementary flow in the downflow pipe and, thus, a supplementary flow in a region of the chamber above the level at which the lower end of the downflow pipe communicates with the chamber.

* * * * *